(12) United States Patent
Innes (10) Patent No.: US 11,079,060 B2
(45) Date of Patent: Aug. 3, 2021

(54) UNIVERSAL TARGET STAND FOR ADAS CALIBRATION

(71) Applicant: Pilkington Group Limited, Lathom (GB)

(72) Inventor: John Innes, Urbancrest, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 16/547,031

(22) Filed: Aug. 21, 2019

(65) Prior Publication Data

US 2019/0376640 A1    Dec. 12, 2019

Related U.S. Application Data

(63) Continuation of application No. PCT/GB2018/050491, filed on Feb. 26, 2018.

(60) Provisional application No. 62/463,476, filed on Feb. 24, 2017.

(51) Int. Cl.
| | |
|---|---|
| *F16M 11/06* | (2006.01) |
| *F16M 11/42* | (2006.01) |
| *G09F 15/00* | (2006.01) |
| *H04N 17/00* | (2006.01) |

(52) U.S. Cl.
CPC ........... *F16M 11/06* (2013.01); *F16M 11/42* (2013.01); *G09F 15/0018* (2013.01); *G09F 15/0062* (2013.01); *H04N 17/002* (2013.01); *F16M 2200/06* (2013.01); *G05B 2219/50393* (2013.01)

(58) Field of Classification Search
CPC .......................................... G05B 2219/50393

USPC ............... 40/606.19, 605, 606.02; 273/348.3
See application file for complete search history.

(56) References Cited

U.S. PATENT DOCUMENTS

| | | | | |
|---|---|---|---|---|
| 4,481,729 A | * | 11/1984 | Weiller | G09F 15/0006 40/584 |
| 5,994,990 A | * | 11/1999 | Ogikubo | G09B 9/14 335/285 |
| 7,121,011 B2 | * | 10/2006 | Murray | G01B 11/2755 33/288 |
| 9,279,670 B2 | | 3/2016 | Schommer | |
| 2009/0326718 A1 | | 12/2009 | Bryfors | |
| 2011/0074112 A1 | | 3/2011 | Allen | |

(Continued)

FOREIGN PATENT DOCUMENTS

| | | |
|---|---|---|
| DE | 102008010805 A1 | 8/2009 |
| DE | 102010062696 A1 | 6/2012 |

(Continued)

OTHER PUBLICATIONS www.noticeboardcompany.com; https://www.noticeboardcompany.com/products/mobile-revolving-magnetic-whiteboard.html, accessed Sep. 13, 2019.

(Continued)

*Primary Examiner* — Kristina N Junge
(74) *Attorney, Agent, or Firm* — Marshall & Melhorn, LLC (57) ABSTRACT

A universal targeting stand for an advanced driver assistance system (ADAS) comprises a central support structure, a target plate selectively connected to the central support structure and a target image attached to the target plate. Selective connection to the target plate allows a common calibration stand to be used for different vehicles even where different targets are required.

23 Claims, 12 Drawing Sheets

(56) References Cited

U.S. PATENT DOCUMENTS

| | | | |
|---|---|---|---|
| 2012/0224311 A1* | 9/2012 | Sutherland | B25J 9/0084 |
| | | | 361/679.01 |
| 2013/0297204 A1 | 11/2013 | Bartels | |
| 2013/0325252 A1 | 12/2013 | Schommer | |
| 2014/0026454 A1* | 1/2014 | Weis | G09F 15/00 |
| | | | 40/610 |
| 2015/0036885 A1 | 2/2015 | Pflug | |
| 2015/0138312 A1 | 5/2015 | Liu | |
| 2016/0073101 A1 | 3/2016 | Keaffaber | |
| 2018/0188022 A1* | 7/2018 | Leikert | G01B 11/2755 |

FOREIGN PATENT DOCUMENTS

| | | |
|---|---|---|
| DE | 202015008954 U1 | 2/2016 |
| DE | 202016103584 U1 | 9/2016 |
| DE | 202015106939 U1 | 12/2016 |
| EP | 2172873 A2 | 4/2010 |
| EP | 2172873 B1 | 4/2010 |
| FR | 2998956 A1 | 6/2014 |

OTHER PUBLICATIONS www.noticeboardcompany.com; https://www.noticeboardcompany.com/products/allure-mobile-lockable-magnetic-board.html; accessed Sep. 31, 2019.

\* cited by examiner

UNIVERSAL TARGET STAND FOR ADAS CALIBRATION

BACKGROUND

The present invention relates to a camera calibration device and a camera calibration method for carrying out camera calibration for an advanced driver assistance system (ADAS).

In recent years, with increasing awareness for safety, more and more vehicles, such as automobiles, have come to be furnished with a camera system, commonly called an advanced driver assistance system (ADAS). Such systems often use image processing technologies instead of simply displaying camera views to provide a better context of the surroundings of the vehicle for a driver.

U.S. Pat. No. 9,279,670B2 (Schommer) is an example of a method and a device for calibrating a surroundings sensor in a vehicle, placing a calibrating panel target and recording an image of the target with the surroundings sensor, wherein the surroundings sensor comprises a camera.

Currently, such systems often require a unique set-up, with different calibration systems of stands and target frames (i.e. optical targets, plates or boards) for different vehicle manufacturers, and/or models for each manufacturer.

SUMMARY OF THE INVENTION

The present invention provides a universal stand and support for optical targets to position the targets at a predetermined height and/or position during calibration having the features set out in claim 1. The universal stand allows a common calibration stand for different vehicles and vehicle manufacturers, even where different numbers and orientations of different targets are required for different vehicles. Additionally provided is a method of using a universal stand for calibrating systems from different vehicle manufacturers. The invention is used for camera calibration on a static vehicle after fitting or replacement of a windshield having at least one camera mounted thereon forming part of an ADAS for the vehicle.

According to a first aspect, the invention in a first embodiment is a universal targeting stand for an advanced driver assistance system, comprising:
a central support structure;
a target plate selectively connected to the support structure; and
a target image removably attached to the target plate.

Preferably, the target image is attached to the target plate by a magnetic attachment.

Preferably, the universal target stand further comprises:
a pair of removable arms extending laterally away from the central support structure; and
a pair of lateral target frames, each of said pair of lateral target frames being attached to a respective one of said lateral arms.

In a second embodiment, a universal targeting stand for an advanced driver assistance system, comprising:
a central support structure;
a central target plate selectively connected to the central support structure;
a pair of removable arms extending laterally away from the central support structure; and
a pair of lateral target plates, each of said pair of lateral target plates being attached to a respective one of said lateral arms by a connecting mechanism; and
a target image removably attached to at least one of the central target plate and the lateral target plates;
wherein each of the central target plate and the lateral target plates are rotatably connected to the central support structure by their connecting mechanisms.

In a third embodiment, a universal targeting stand for an advanced driver assistance system, comprising:
a central support structure;
a target plate;
the target plate having front and rear faces, with the rear face of the target plate being selectively connected to the central support structure,
the front face of the target plate having a magnetic surface disposed thereon, and
a magnetic target disposed on and held by the magnetic surface of the target plate, so that the magnetic target is removably attached to the target plate.

Preferably, wherein the target plate comprises a plurality of panel sections.

Preferably, wherein the panel sections comprise four panel sections which are foldably connected in series to each other.

Preferably, wherein the stand comprises a wheeled base.

Preferably, further comprising a calibrating mat, the calibrating mat comprising a series of grid lines for calibration.

According to a second aspect, the invention is a method of using a universal targeting stand of the first aspect, comprising the step of affixing a target sheet to a target plate by utilizing a target sheet that is magnetic or attachable by hook and loop fasteners to the target plate.

According to a third aspect, the invention is a target plate for use with the universal targeting stand of the first aspect, comprising a target image printed on a side of a vinyl sheet and a magnetic backing sheet.

According to a fourth aspect, the invention is use of a calibrating mat with a universal targeting stand of the first aspect, the calibrating mat comprising ends connecting a mat surface between them wherein the mat surface has measurement markings for aligning with a vehicle.

BRIEF DESCRIPTION OF THE DRAWINGS

The invention is disclosed further by the attached drawings.

DETAILED DESCRIPTION OF THE PREFERRED EMBODIMENTS

Figure 1:
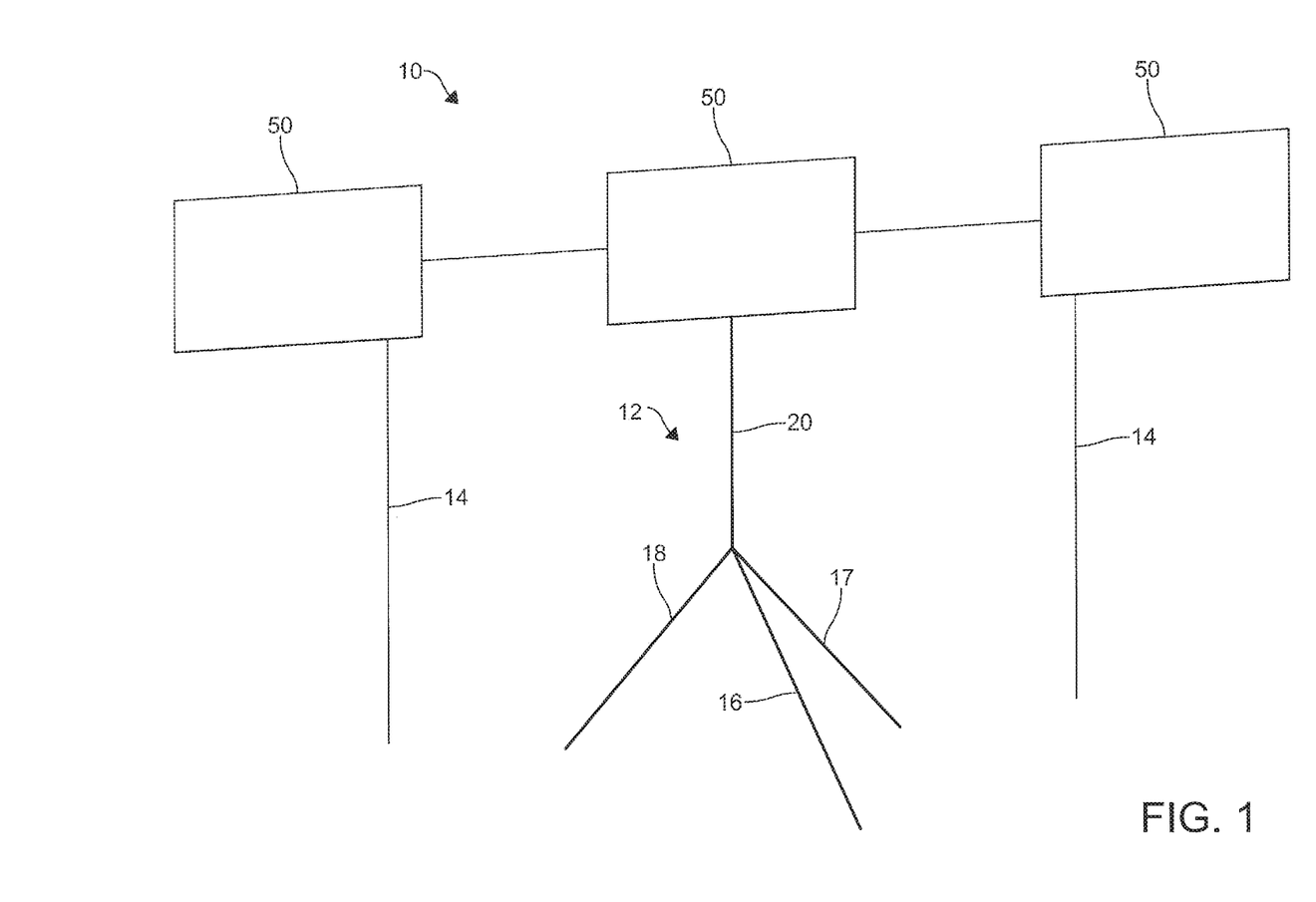
FIG. 1 shows a schematic view of the present invention with three targeting boards.

FIG. 1 shows a universal ADAS stand 10 according to the present invention. The universal stand 10 includes a central support 12 with two side supports 14. The central support 12 is preferably a tripod with legs 16, 17, 18 and central beam 20. While FIG. 1 depicts a tripod arrangement for the central support 12, other support structures are suitable for use within the scope of the present invention. Target plates or boards 50 are attached to each of the central 12 and side 14 supports for calibrating an ADAS. The target plates 50 are preferable made of steel or another material to which a magnet can be affixed.

Conventional ADAS calibration systems typically use a single targeting image, two targeting images or three targeting images. In the case of a single target ADAS calibration system, the invention as depicted in FIG. 1 can be used with just the central support 12 and the side supports 14 can be unused, or removed for convenience. In an ADAS calibration system where two target frames are required, any one of the central support 12 and one of the side supports 14 can support target plates 50 for targeting, or the two side supports 14 can each support a target plate 50 for targeting. In an ADAS calibration system where three target frames are required, each of the central 12 and side supports 14 can support an individual plate 50 for targeting.

In a preferred embodiment of the present invention, the central support 12 utilizes a tripod system, as discussed above, and the side supports merely utilize a single beam, as shown. However, it is possible within the scope of the invention that the side supports 14 could also be tripods, or any other suitable support system. Also within the scope of the present invention, the side targets could be supported with beams from the central support, without additional support.

Figure 2:
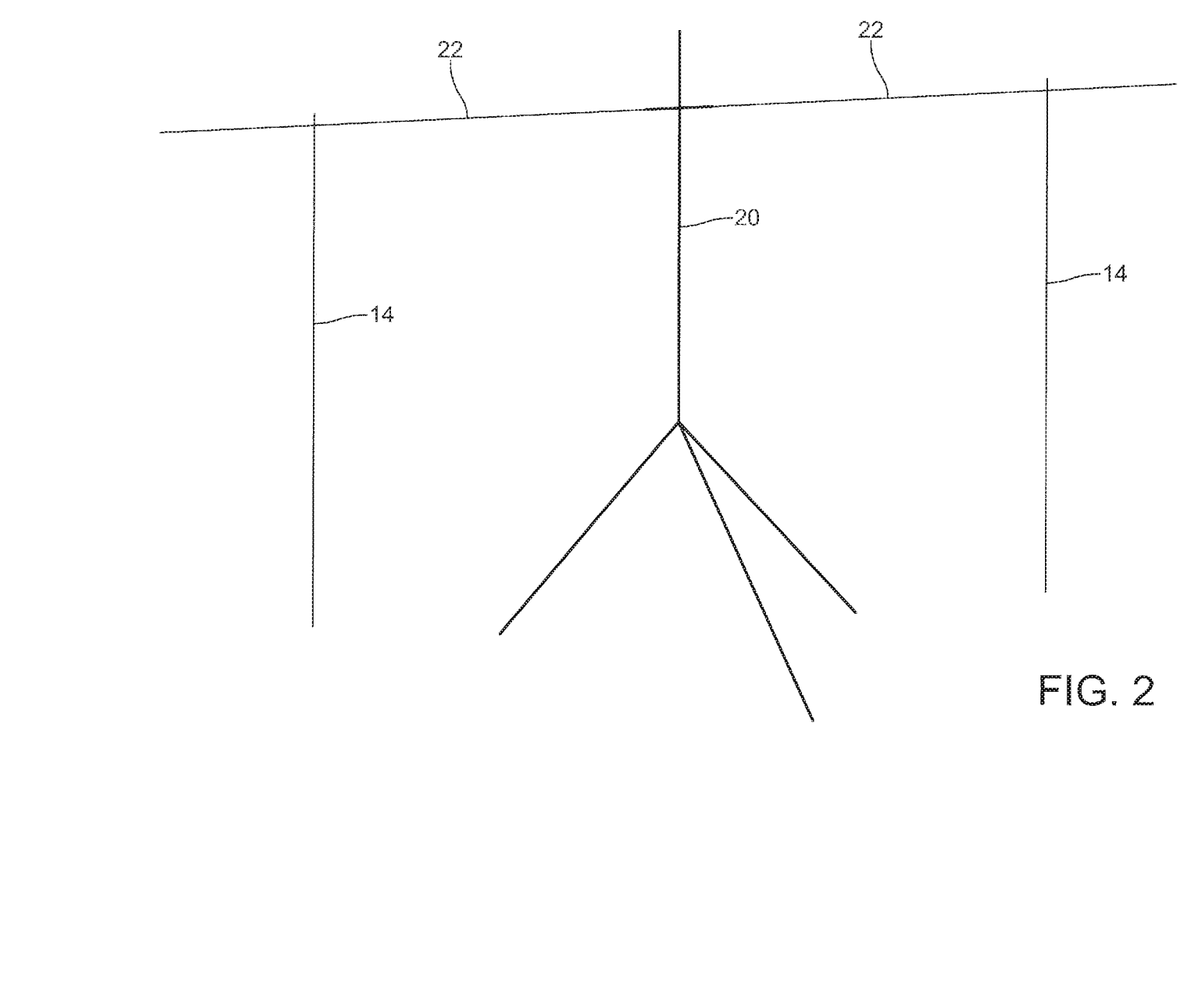
FIG. 2 shows an embodiment of the present invention with no targeting boards.

FIG. 2 shows an embodiment of the universal ADAS stand wherein no target frames are attached. The central support 12 is connected to two side arms 22. Side arms 22 extend laterally from the central support to support additional targeting frames for three target ADAS stands.

Figure 3:
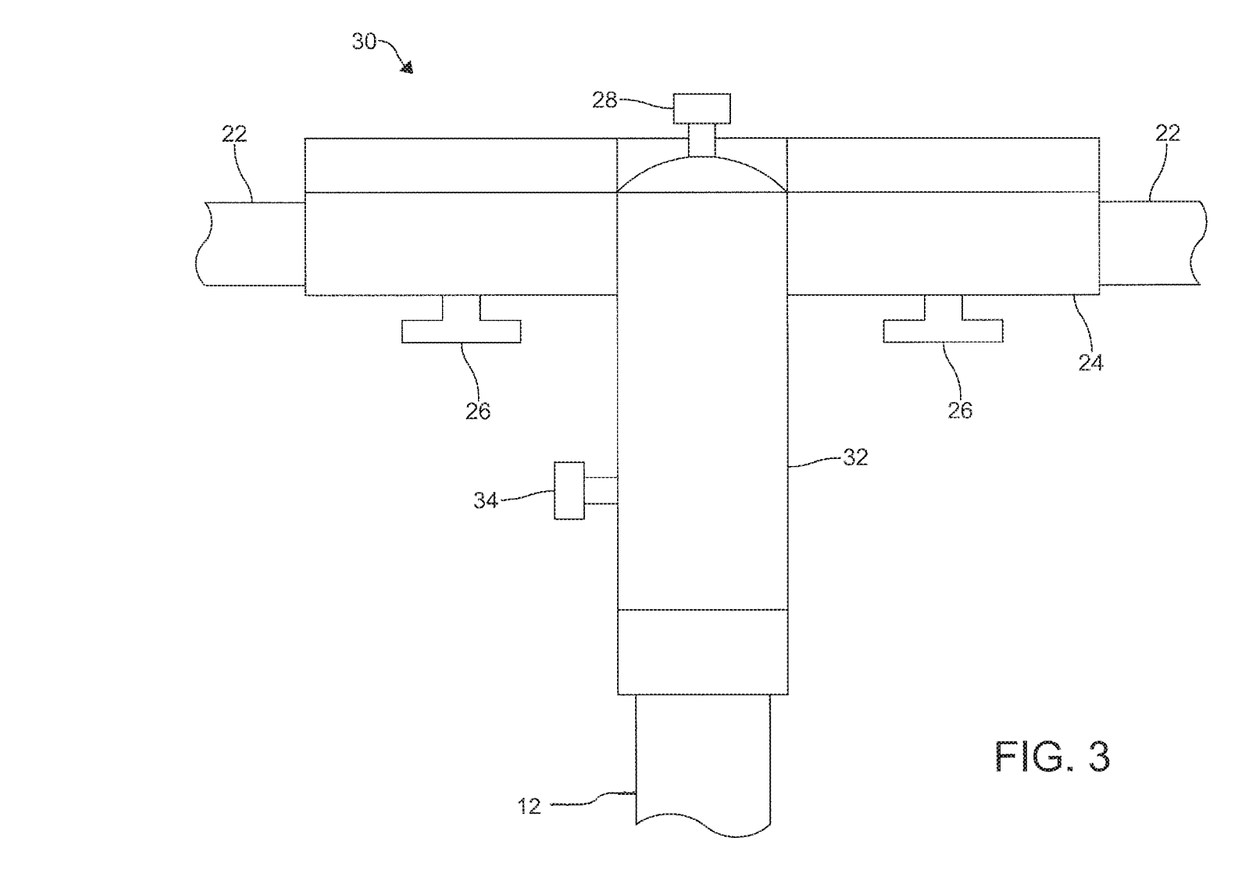
FIG. 3 shows a mechanism for holding a targeting board to the stand.

FIG. 3 shows a mechanism 30 for holding the target frame in place. Each of the side arms 22 can be connected to the central support 12 by connecting piece 24. Preferably connecting piece 24 slides over side arm 22 and is held in place by adjusting knob 26. Knob 26 can have a bolt (not shown) which can extend into precut holes (not shown) in arm 22, or can frictionally fit against the exterior of arm 22.

The mechanism 30 can also contain a disconnecting knob 28 which can be used to secure a target plate 50 (see FIG. 1) to the universal support. Preferably the mechanism 30 also has a receiving portion 32 which sits over the central support 12 to hold the mechanism 30 in place. Preferably the receiving portion is rotatable with respect to the central support 12, and can include a locking knob 34 to secure the mechanism 30 with respect to the central support 12.

While a specific form of tripod base is disclosed herein, the invention is designed to be used with a variety of standard bases, typically tripod bases, but other known support structures can be used in conjunction with the present invention.

Figure 4:
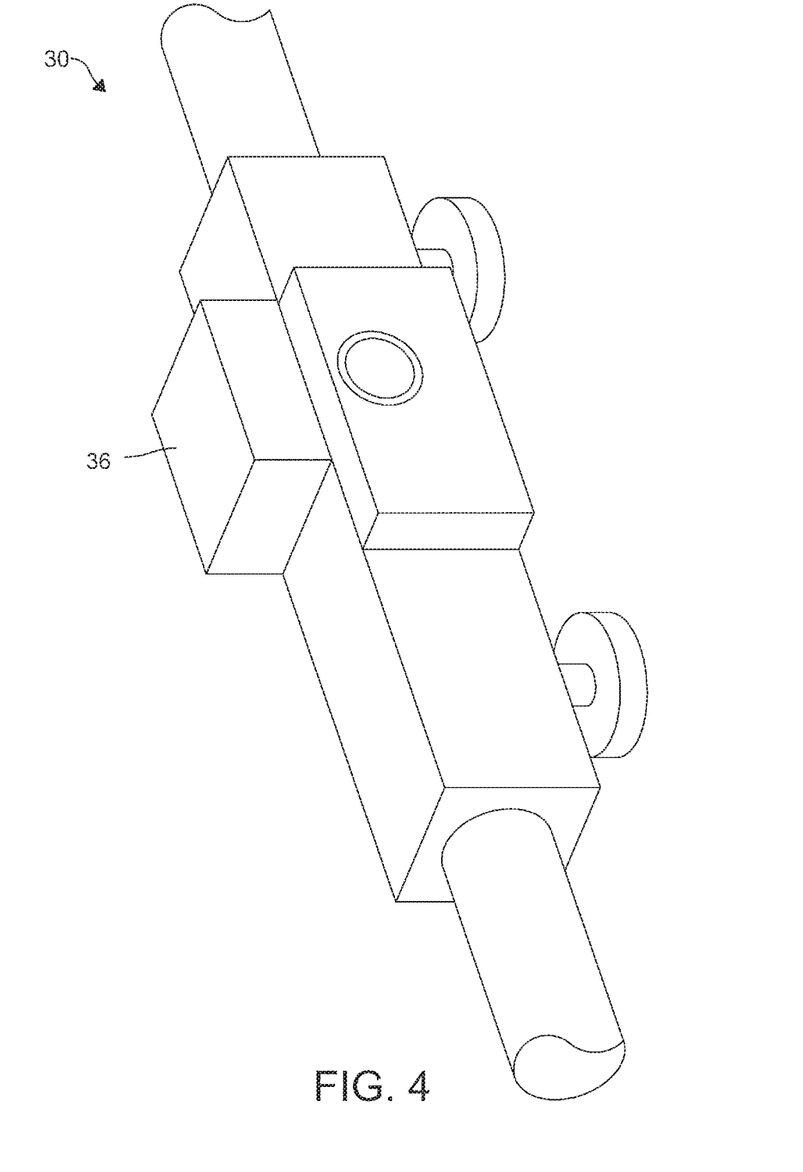
FIG. 4 shows the mechanism of FIG. 3 without a tripod attached.

FIG. 4 shows a mechanism 30 for use in conjunction with the present invention, wherein the tripod has been removed. This embodiment also shows a level bubble 36, which can be used in conjunction with the present invention to allow for leveling of the targets.

Figure 5:
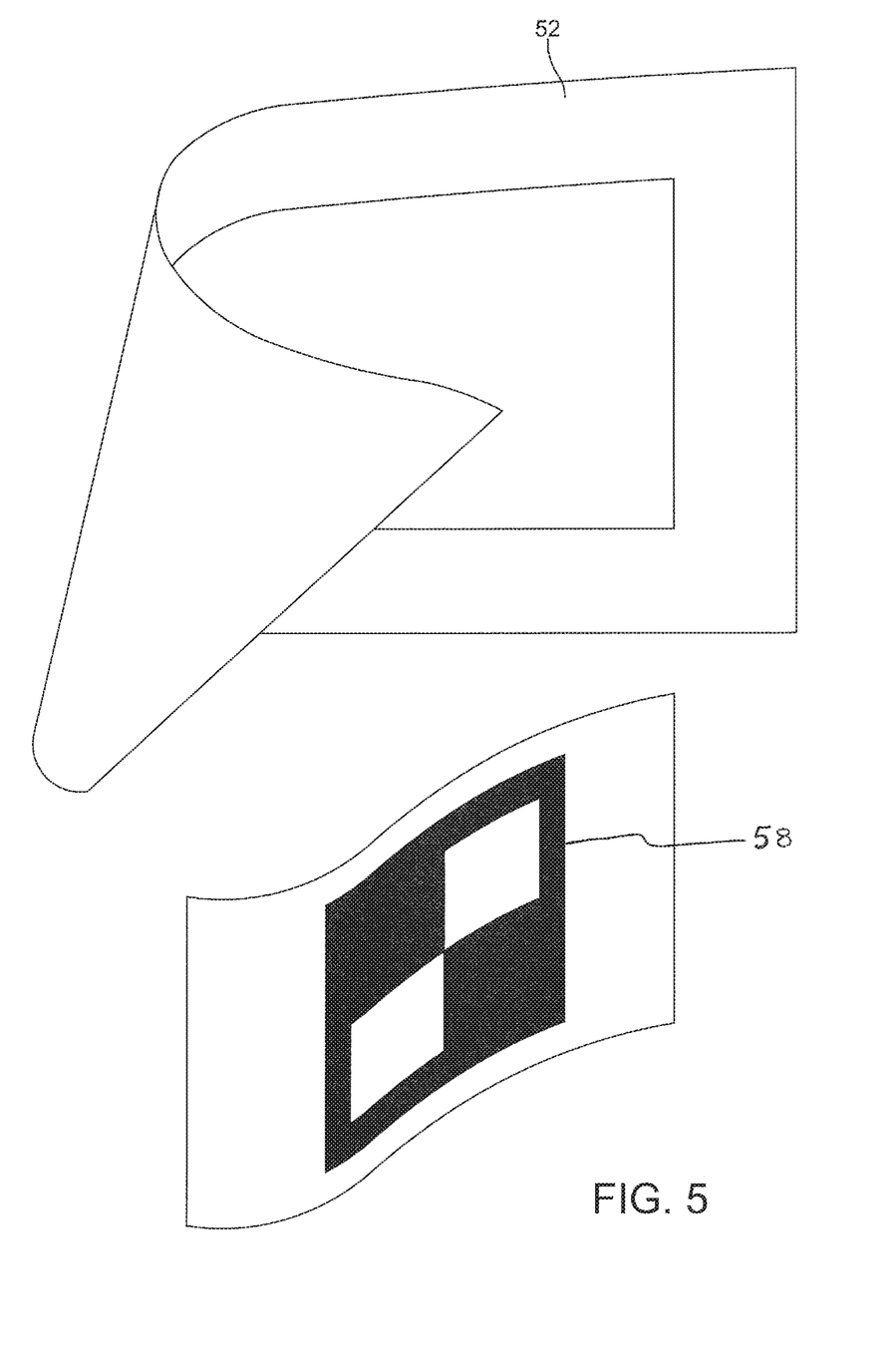
FIG. 5 shows a vinyl target for use with an embodiment of the present invention.

FIG. 5 shows a vinyl target. In preferred embodiments of the present invention, a target 52 is affixed to each of the target plates 50 required for calibration of the ADAS of the relevant vehicle. It has been found that a preferred method for affixing the target 52 to the target plate 50 is by utilizing a target 52 that is magnetic to attach to the target plate 50. To accomplish this, a preferred embodiment of the present invention prefers that the target image 58 or images be obtained and printed on a vinyl sheet with a magnetic backing. An example of this is shown on FIG. 6. A magnetic target of this type is easily attachable on the target plate 50 and can then be removed after use. Therefore multiple targets 52 can be available representing different makes and models of vehicles from different manufacturers. Additionally, the target 52 can thus be rotatable and movable on the board 50 so that different targets for multiple vehicles and manufacturers can be accommodated. While a magnetic target board 50 and target 52 are preferred, alternative fastening methods such as Velcro, hook and loop fasteners, static attraction or other known attachment methods can be utilized within the scope of the present invention. Any attachment that allows for repeated application and removal of a variety of targets to the target board could be utilized within the scope of the present invention. Thus, the present invention allows for repeated use of multiple targets once they are prepared.

Figure 6:
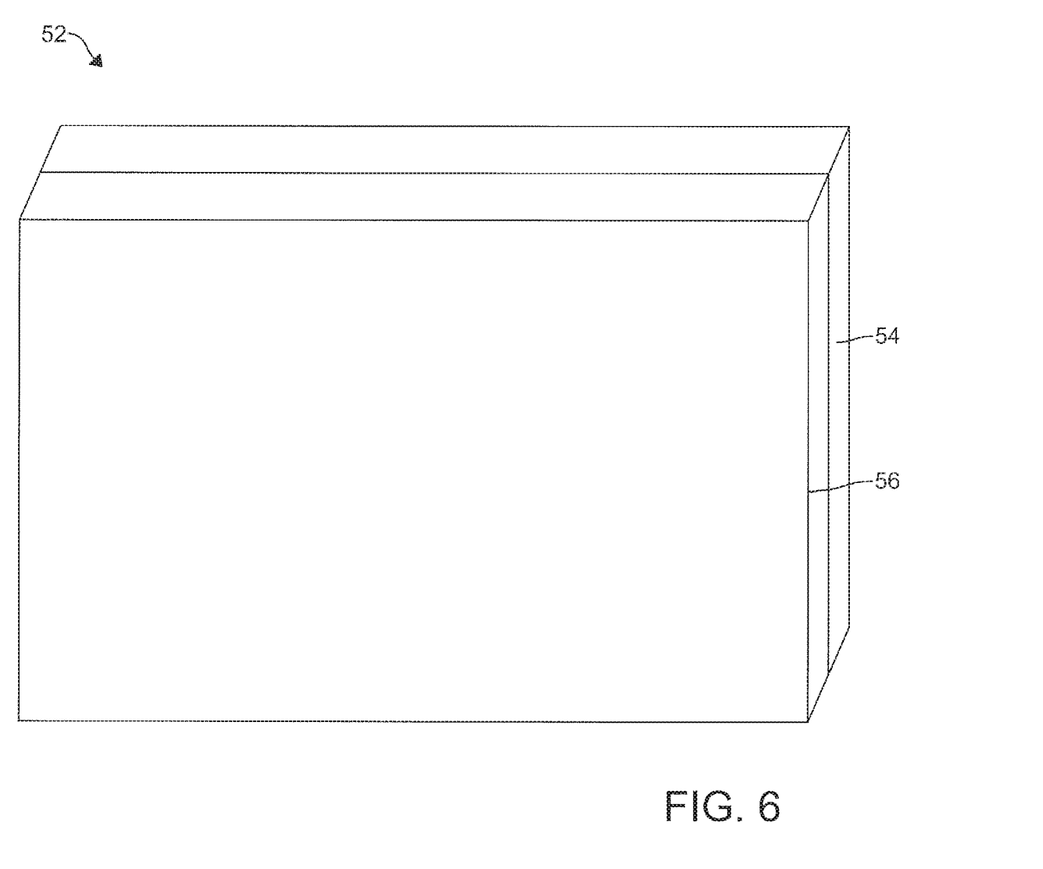
FIG. 6 shows a schematic view of a magnetic backed vinyl target for use in the present invention.

FIG. 6 shows target sheet 52 which, in this embodiment, includes a magnetic backing sheet 54 and a vinyl target side 56 with an image printed on the target side. Preferably, once an electronic version of the image is obtained it is printed onto the target side 56 of the target sheet 52. The target sheet can then be affixed by an operator onto the magnetic target plate 50 by the magnetic backing 54. The operator can align the target 52 manually for calibration of the ADAS.

Figure 7:
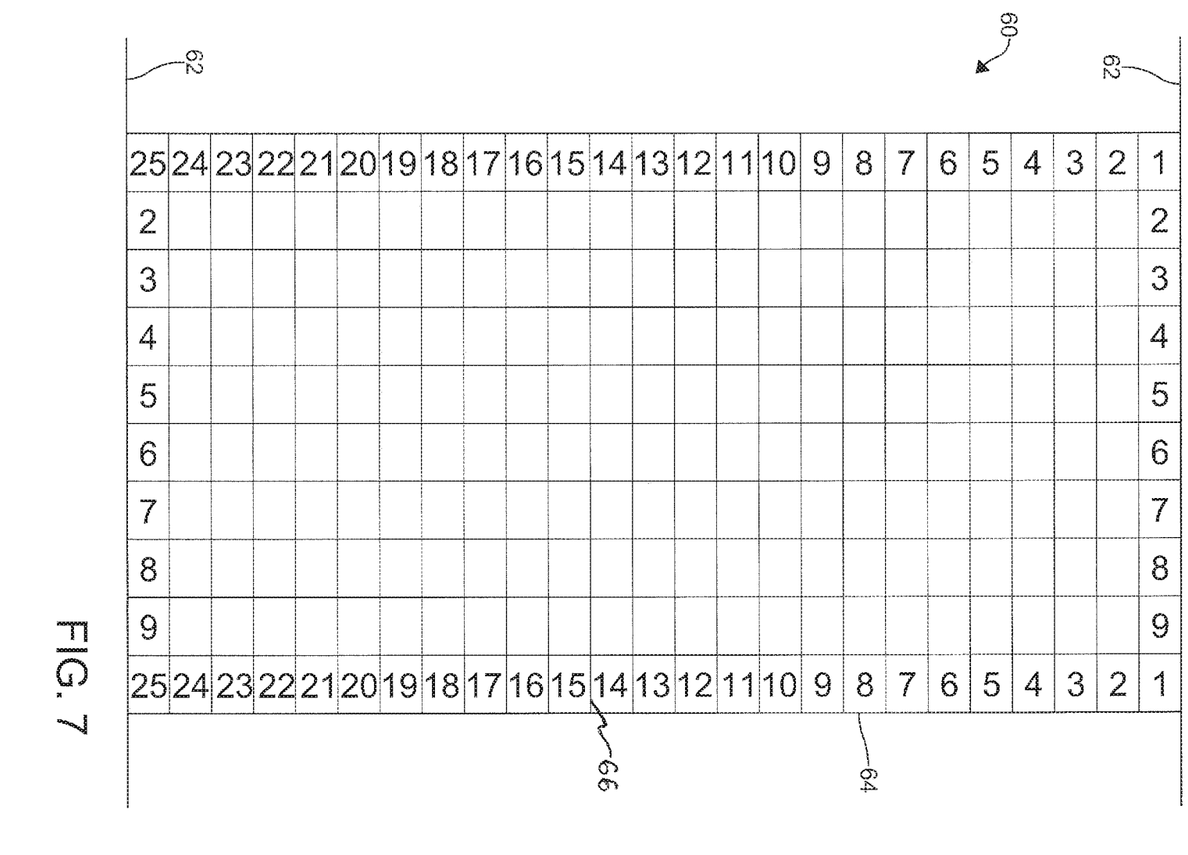
FIG. 7 shows an alignment mat for use with the present invention.

In a preferred embodiment a calibrating mat 60 can be utilized by the operator to help align the universal ADAS targeting stand 10. An example of such a mat is shown schematically in FIG. 7. In a preferred embodiment, the mat 60 includes ends 62, which can be metal rods or other suitable materials connecting a mat surface 64 between them. Preferably, the mat surface 64 is vinyl or other durable material. Measurement markings 66 can be placed on the mat surface 64 so the operator can align the universal ADAS stand relative to the vehicle. For example, the mat can be aligned at the front tires of the vehicle to allow the operator to determine distances to the vehicle for the precise measurements required. The ends 62 can then be pulled taut to help ensure that proper alignment is maintained. A preferred mat could be white vinyl with a printed black grid with measurements printed on the mat to display relative distances. Such a mat can be placed at the front of the vehicles front tires to ensure measurements are substantially square to the front of the vehicle. For an example, measurements can be printed on the mat at 1 foot increments, or any other increment which may be suitable.

Figure 8:
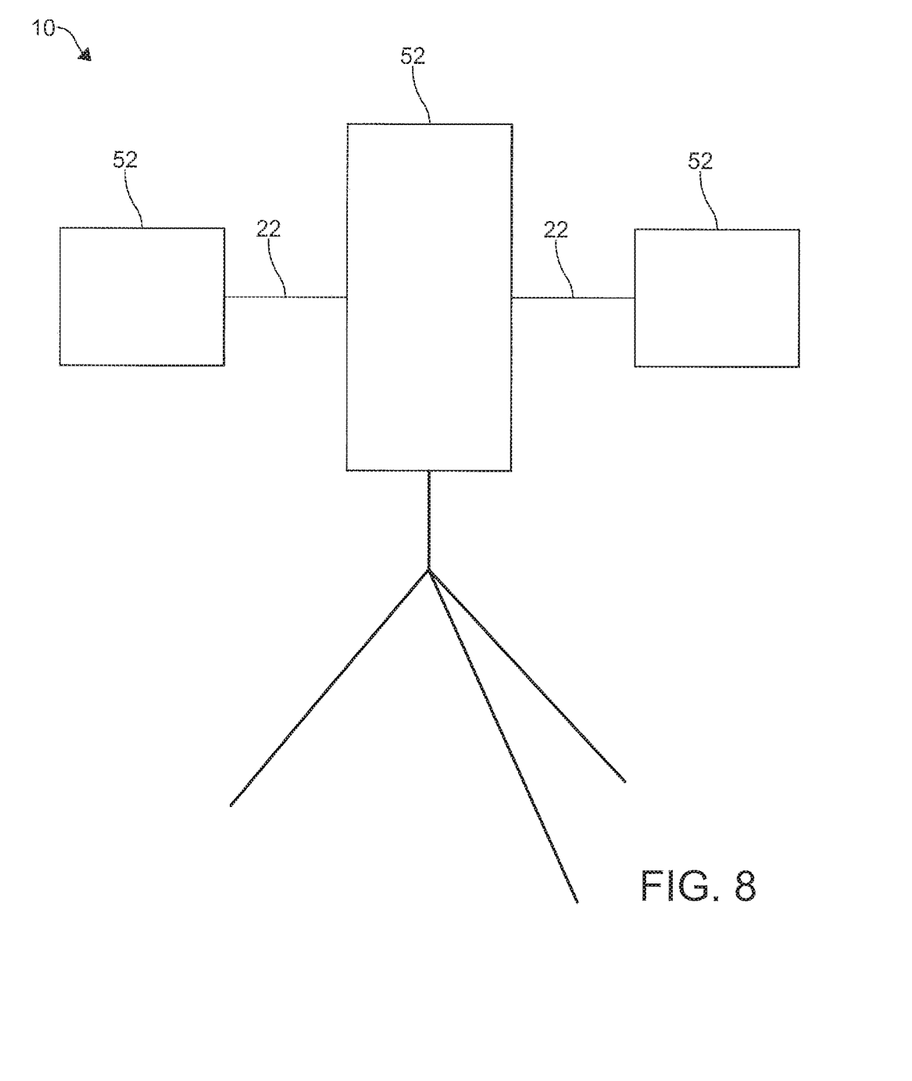
FIG. 8 shows an embodiment of the present invention with three target frames attached.

FIG. 8 shows an example of a three target ADAS stand with a single tripod for supporting all three frames, with target images attached to target sheets 52. The target sheets 52 are mounted on target plates 50. The present invention allows 360 degree rotation of all of the target plates 50, and is convertible in that multiple positions relative to the central target can be provided by the side targets. The arms 22 can additionally be "telescoping", to extend the distance between the central and side targets to accommodate systems from different manufacturers.

In using the present invention, the operator can determine from a particular vehicle how many target frames are needed. If a single frame is needed, the side arms 22 and side supports 14 can be removed. The target 52 can then be attached to the target plate 50 and can then be aligned for the user of calibration of the ADAS. When three target frames are needed, the side arms 22 and supports 14 can be attached. The targets can be affixed to the target plates 50 which are attached to a mechanism at each of the target points, and each can be arranged for calibration of the ADAS.

FIGS. 9-14 depict an additional embodiment of the present invention, a stand 100. While the above embodiment of a stand 10 is suitable for most ADAS targets on the market, some larger targets and more complex configurations require a larger stand than the stand 10.

Figure 9:
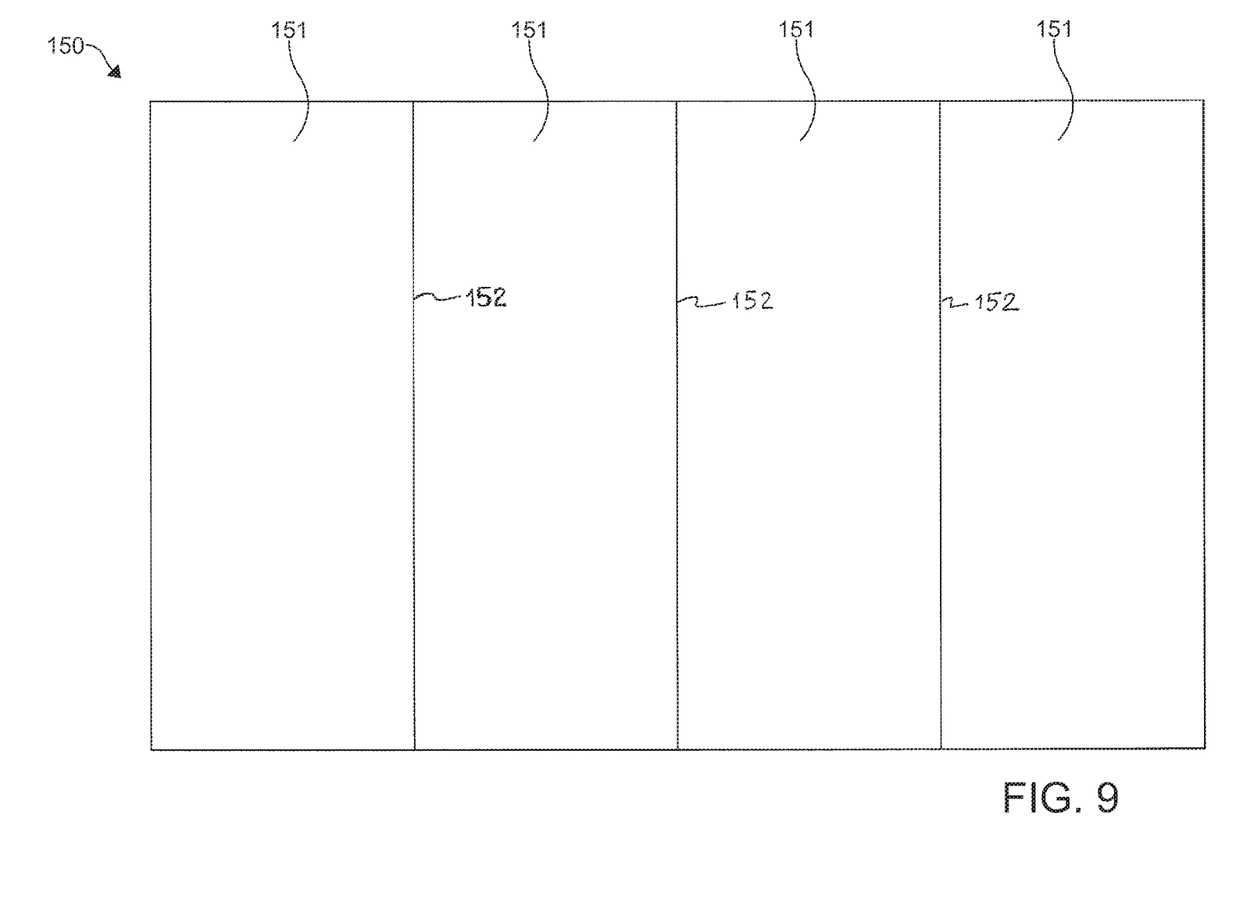
FIG. 9 shows an embodiment of a target plate according to the present invention.

In the embodiment of a target plate 150 shown in FIG. 9, a series of panel sections 151 make up the target plate 150. Preferably, the sections 151 are connected to each other, for example by hinges 152 and can be folded for storage. Alternatively the sections 151 can be separable and can be connected together for larger targets. Preferably, four panel sections 151 are included as this is sufficient for most applications.

In a preferred embodiment the panel sections 151 comprise "Gator" board with magnetic receptive material on both sides of the panel. In another embodiment the panel sections comprise PVC panels, preferably white PVC, covered on one side with magnetic receptive material. In a preferred embodiment the back side of the panel has two steel tape strips running the vertical length of the panels and a panel hanger at the top of the panel both used to hold the panel in position on a stand 100 (see FIG. 12).

Figure 10:
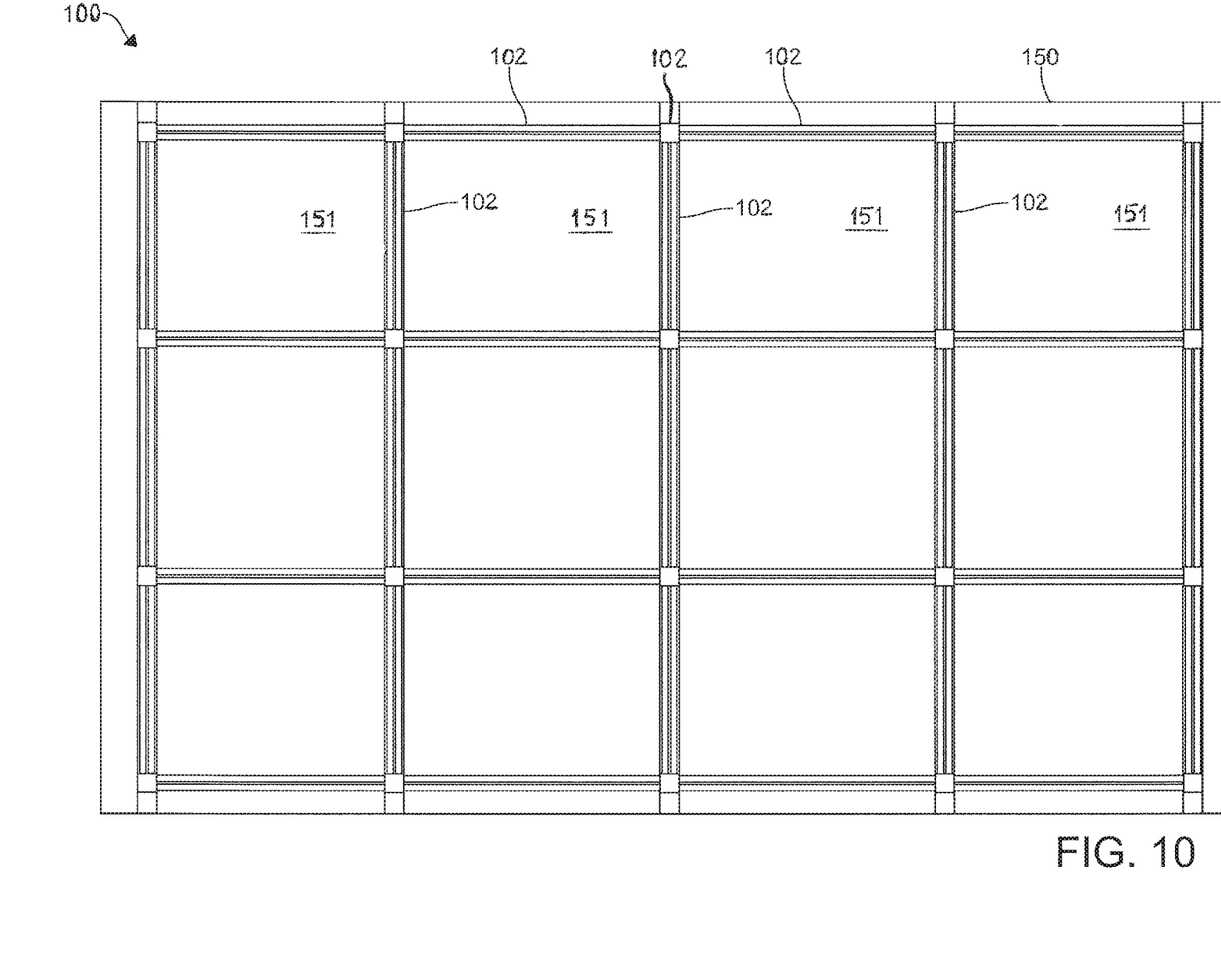
FIG. 10 shows an embodiment of a target plate and stand according to the present invention.

As shown in FIG. 10, the stand 100 comprises the panel sections 151. In a preferred embodiment, hinged elements 152 connect each of the panel sections 151 on the back face of the panel sections 151. A support structure 102, of any known configuration, then supports the folding target plate 150 in an upright position. Preferably the stand structure is an "accordion-type" stand.

Preferably the support structure 102 comprises a central support and a plurality of side support structures. Advantageously the target plate 150 is selectively connected to the support structure 102. By releasing the target plate 150 from the support structure 102, the stand 100 is collapsible.

Figure 11:
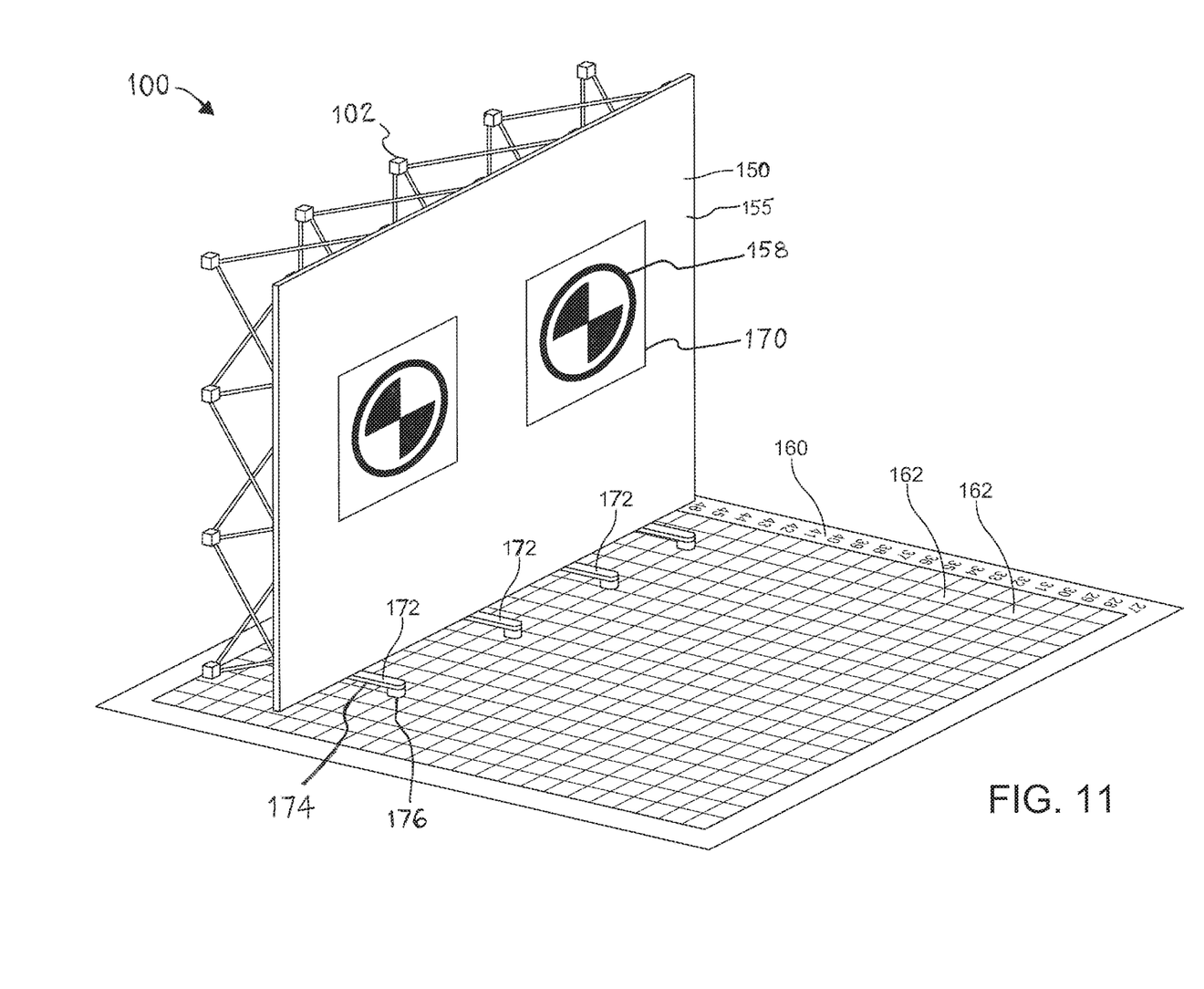
FIG. 11 shows an embodiment of a calibrating mat and a target stand according to the present invention.

FIG. 11 shows the folding target plate 150 with a magnetic material 155 disposed on the front face of the folding target plate 150. One or more magnetic targets 170 are placed on front face of the folding target plate 150 for calibration of the ADAS. Advantageously the magnetic targets 170 are removably attached to the folding target plate 150 so that stand 100 is configurable for different target images and locations.

FIG. 11 further depicts an embodiment of a calibrating mat 160 for use with the present invention. The calibrating mat 160 includes grid lines 162 for providing easy reference to distance measurements from the target to calibrate the ADAS. Also shown on FIG. 11 is an embodiment of the stand 100 with a wheeled base 172. Providing a wheeled base allows easy mobility of the stand 100 once assembled. The wheeled base preferably comprises a series of bars 174 disposed perpendicular to the folding target plate 150 with each bar 174 having wheels 176 at opposing ends of the bars. The wheels 176 preferably comprise a locking mechanism of any acceptable configuration so that the stand can be locked into a position once the target is moved to the desired position.

Figure 12:
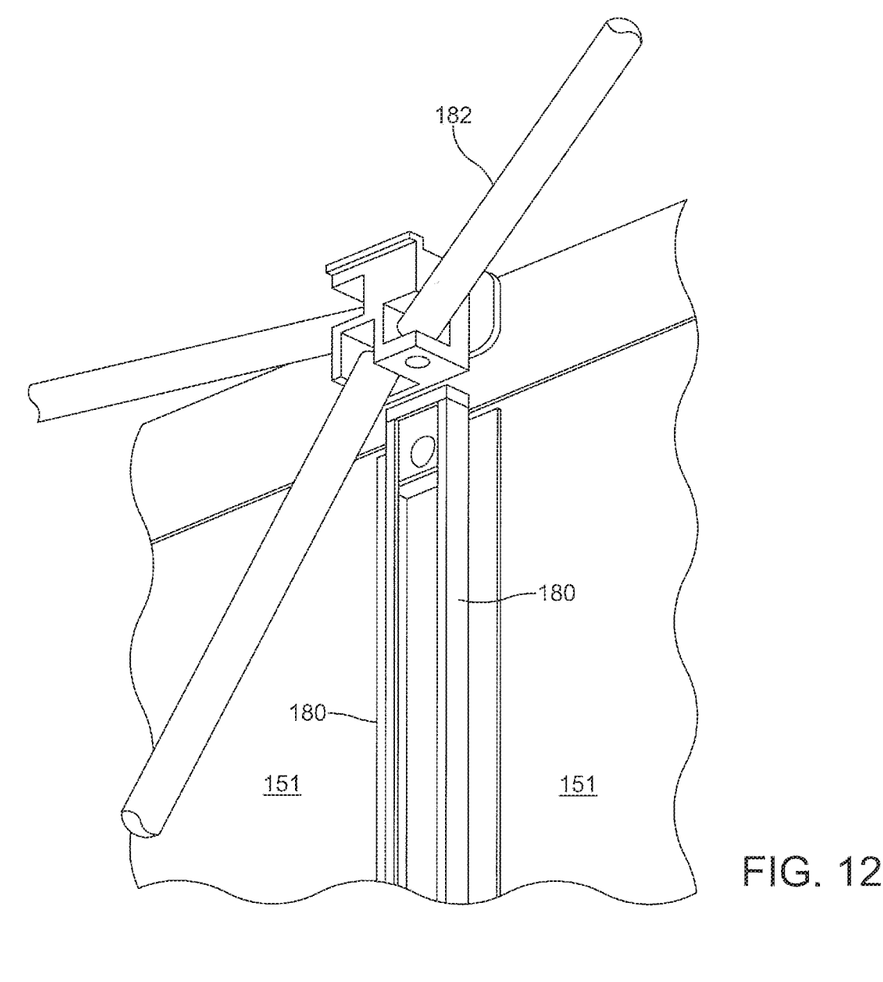
FIG. 12 shows the rear face of a target plate according to an embodiment of the present invention.

FIG. 12 shows a preferred arrangement comprises two steel tape strips running vertically on the rear of the panel sections 151. Preferably, each panel section 151 is about 2.5 foot wide and 10 foot in height. Running vertically along a rear face of these panel sections are strips 180, with each strip preferably comprising a metal tape. These strips 180 are designed with an adhesive surface to help adhere the panels to the stand along the length of the panel sections and a panel hanger to hold the target panels, however other attachment mechanisms can be used within the scope of the invention. Also disposed at the top of each panel is at least one hanger 182. The hangers 182 are secured near the top of the panels sections 151 and are used to help support the targets on the stand.

The stand is large enough for most known target configurations yet the stand is collapsible and the panels can be removed for ease of transport and storage. The stand is attached to removable wheels, preferably four sets of removable wheels, to allow for adjustment/alignment of the target stand. Once the targeting stand is properly positioned the wheels lock the stand into position. The targets are made on a magnetic material to attach to the magnetic receptive side of the panel allowing them to be repositioned or removed at will.

The Master Target Stand described herein differs from known stands because it will accommodate almost all known targets and target configurations and it is portable. Some OEM targets are permanently affixed targets that are made for their specific makes and models. Some OEM stands are not easily transportable, which is also addressed by the present invention.

In accordance with the provisions of the patent statutes, the present invention has been described in what is considered to represent its preferred embodiments. However, it should be noted that the invention can be practiced otherwise than as specifically illustrated and described without departing from its spirit or scope.

LIST OF REFERENCES

10 Universal targeting stand for ADAS
12 Central support structure (central support)
14 Side support
16, 17, 18 Legs
20 Central beam
22 Side arms
24 Connecting piece
26 Adjusting knob
28 Disconnecting knob
30 Mechanism (connecting mechanism)
32 Receiving portion
34 Locking knob
36 Level bubble
50 Target plate (target board, board, target frame)
52 Target sheet (target)
54 Magnetic backing sheet
56 Target side
58 Image
60 Mat
62 End (of mat)
64 Mat surface
66 Markings
100 Stand
102 Support structure (central support structure)

150 Folding target plate
151 Panel sections
152 Hinged elements
155 Magnetic material
158 Image
160 Calibrating mat
162 Grid lines
170 Magnetic targets
172 Wheeled base
174 Bar (of wheeled base)
176 Wheels
180 Strip
182 Hanger

The invention claimed is:

1. A universal targeting stand for an advanced driver assistance system, comprising:
   a central support structure;
   a target plate selectively connected to the central support; and
   a target image removably magnetically attached to the target plate, wherein
   the target image is made on a magnetic material to attach to a magnetic receptive side of the target plate; and
   an entire major surface of the target image is supported by and in contact with the target plate.

2. The universal targeting stand for an advanced driver assistance system according to claim 1, further comprising:
   a pair of removable arms extending laterally away from the central support structure; and
   a pair of lateral target plates, each of said pair of lateral target plates being attached to a respective one of said lateral arms.

3. The universal targeting stand for an advanced driver assist system according to claim 2, wherein each of the target plate and the lateral target plates are rotatably connected to the central support structure by a respective connecting mechanism.

4. The universal targeting stand for an advanced driver assistance system according to claim 3, comprising a mechanism to allow a user to level the target plate.

5. The universal targeting stand for an advanced driver assistance system according to claim 4, wherein the mechanism to allow a user to level the target plate comprises a level bubble.

6. The universal targeting stand for an advanced driver assistance system according to claim 1, wherein the target image comprises flexible vinyl.

7. The universal targeting stand for an advanced driver assistance system according to claim 1, wherein:
   the target image comprises two sheets:
   a target image printed on a side of a vinyl sheet removably magnetically attached to the target plate, and
   a magnetic backing sheet to attach to a magnetic receptive side of the target plate.

8. The universal targeting stand for an advanced driver assistance system according to claim 7, wherein the target image comprises flexible vinyl.

9. The universal targeting stand for an advanced driver assistance system according to claim 1, comprising a lock to secure the target plate in position relative to the central support structure.

10. The universal targeting stand for an advanced driver assistance system according to claim 1, wherein the target image is printed on a side of a vinyl sheet.

11. A universal targeting stand for an advanced driver assistance system, comprising:
    a central support structure;
    a target plate selectively connected to the central support; and
    a target image removably magnetically attached to the target plate;
    a pair of removable arms extending laterally away from the central support structure; and
    a pair of lateral target plates, each of said pair of lateral target plates being attached to a respective one of said lateral arms; wherein
    the target image is made on a magnetic material to attach to a magnetic receptive side of the target plate;
    an entire major surface of the target image is supported by and in contact with the target plate.

12. The universal targeting stand for an advanced driver assistance system according to claim 11, wherein the side arms are telescoping.

13. The universal targeting stand for an advanced driver assistance system according to claim 12, further comprising a level bubble for leveling the target plates.

14. The universal targeting stand for an advanced driver assistance system according to claim 13, wherein the target image is printed on a side of a flexible vinyl sheet.

15. A universal targeting stand for an advanced driver assistance system, comprising:
    a central support structure;
    a base for the central support structure, wherein the base comprises one of:
      a) three legs, the three legs forming a tripod to support the central support structure; and
      b) a wheeled base, said wheeled base comprising at least two substantially parallel bars, with wheels attached to said bars, and structure to connect said substantially parallel bars to said central support structure; and
    a target plate selectively connected to the central support;
    a mechanism to allow a user to level the target plate; and
    a target image removably magnetically attached to the target plate, wherein
    the target image is made on a magnetic material to attach to a magnetic receptive side of the target plate; and
    an entire major surface of the target image is supported by and in contact with the target plate.

16. The universal targeting stand for an advanced driver assistance system according to claim 15, wherein the mechanism to allow a user to level the target plate comprises a level bubble for leveling the target plates.

17. The universal targeting stand for an advanced driver assistance system according to claim 16, further comprising a pair of removable arms extending laterally away from the central support structure; and
    a pair of lateral target plates, each of said pair of lateral target plates being attached to a respective one of said lateral arms.

18. The universal targeting stand for an advanced driver assistance system according to claim 17, wherein each of said pair of removable arms are telescoping.

19. The universal targeting stand for an advanced driver assistance system according to claim 18, wherein the target image is printed on a side of a flexible vinyl sheet.

20. A method for calibrating an advanced drive assistance system using a universal targeting stand for an advanced driver assistance system according to claim 1, comprising:
    providing a vehicle with an advanced driver assistance system to be calibrated:
    positioning the universal targeting stand to calibrate the advanced driver assistance system;

selecting one or more appropriate target images for the advanced driver assistance system to be calibrated;

removably magnetically attaching the one or more target images to the target plate, aligning the one or more target images for calibrating the advanced drive assistance system; and calibrating the advanced driver assistance system.

21. The method according to claim 20, wherein the target image is printed on a side of a flexible vinyl sheet.

22. A universal targeting stand for an advanced driver assistance system, comprising:
  a central support structure;
  a target plate selectively connected to the central support structure;
  a target image comprising a target printed on a side of a flexible vinyl sheet removably attachable to the target plate;
  a pair of removable arms extending laterally away from the central support structure;
  a pair of lateral target plates, each of said pair of lateral target plates being attached to a respective one of said lateral arms;
  a locking mechanism to secure the target plate in position relative to the central support structure; and
  a leveling bubble to allow a user to level the target plate;
  wherein
    the target image is made on a magnetic material to attach to a magnetic receptive side of the target plate;
    an entire major surface of the target image is supported by and in contact with the target plate; and
    each of the target plate and the lateral target plates are rotatably connected to the central support structure by a respective connecting mechanism.

23. The universal targeting stand for an advanced driver assistance system according to claim 22, further comprising a base for the central support structure, wherein the base comprises one of:
  a) three legs, the three legs forming a tripod to support the central support structure; and
  b) a wheeled base, said wheeled base comprising at least two substantially parallel bars, with wheels attached to said bars, and structure to connect said substantially parallel bars to said central support structure; and
  the target image is printed on a side of a flexible vinyl sheet.

* * * * *